(12) United States Patent  (10) Patent No.: US 9,239,769 B2
Oelsner et al.  (45) Date of Patent: Jan. 19, 2016

(54) METHOD FOR REMOTE MAINTENANCE OF A DEVICE

(71) Applicant: HEIDELBERGER DRUCKMASCHINEN AG, Heidelberg (DE)

(72) Inventors: Tom Oelsner, Erzhausen (DE); Andreas Hohl, Heidelberg (DE); Mark Reinhard, Heidelberg (DE)

(73) Assignee: HEIDELBERGER DRUCKMASCHINEN AG, Heidelberg (DE)

( * ) Notice: Subject to any disclaimer, the term of this patent is extended or adjusted under 35 U.S.C. 154(b) by 331 days.

(21) Appl. No.: 13/851,499

(22) Filed: Mar. 27, 2013

(65) Prior Publication Data

US 2013/0262929 A1  Oct. 3, 2013

(30) Foreign Application Priority Data

Mar. 27, 2012 (DE) .......................... 10 2012 006 046

(51) Int. Cl.
*G06F 11/00* (2006.01)
*G06F 11/26* (2006.01)
*G06F 15/16* (2006.01)
*H04L 12/24* (2006.01)
*H04L 29/08* (2006.01)

(52) U.S. Cl.
CPC ................ *G06F 11/26* (2013.01); *G06F 15/16* (2013.01); *H04L 41/0226* (2013.01); *H04L 67/025* (2013.01)

(58) Field of Classification Search
CPC .................................. G06F 15/16; H04L 29/06
See application file for complete search history.

(56) References Cited

U.S. PATENT DOCUMENTS

| 5,613,096 | A | 3/1997 | Danknick |
| 6,400,729 | B1 * | 6/2002 | Shimadoi ................ H04L 69/32 370/466 |
| 7,259,710 | B2 * | 8/2007 | Kisliakov ...................... 341/176 |
| 7,287,473 | B2 | 10/2007 | Kleibaumhueter et al. |
| 7,328,347 | B2 | 2/2008 | Keim et al. |
| 2002/0083214 | A1 * | 6/2002 | Heisig ...................... H04L 67/42 719/315 |
| 2003/0126297 | A1 * | 7/2003 | Olarig ...................... H04L 47/30 709/250 |
| 2003/0194991 | A1 * | 10/2003 | Gilmour ................. H04L 12/26 455/414.1 |
| 2004/0257857 | A1 * | 12/2004 | Yamamoto .............. G06F 3/061 365/154 |
| 2006/0051097 | A1 | 3/2006 | Dybsetter et al. |
| 2006/0236351 | A1 | 10/2006 | Ellerbrock et al. |
| 2007/0033327 | A1 * | 2/2007 | Sinclair ................. G06F 3/0605 711/103 |
| 2008/0082690 | A1 * | 4/2008 | Landry ................... H04L 69/18 709/246 |
| 2008/0313319 | A1 * | 12/2008 | Geffin ........................... 709/223 |

(Continued)

OTHER PUBLICATIONS

German Patent and Trademark Office Search Report, dated Nov. 15, 2012.

*Primary Examiner* — Amine Riad
(74) *Attorney, Agent, or Firm* — Laurence Greenberg; Werner Stemer; Ralph Locher

(57) ABSTRACT

A method for the remote maintenance of devices that include a computer by way of a remote maintenance computer. At least one protocol is used to exchange data between the local computer and the remote maintenance computer. The protocol adaptation level is provided which, prior to a data transfer process, evaluates the protocol for exchanging data between the computer and the remote maintenance computer in terms of the compatibility of the protocol with the upcoming data transfer process. If necessary, the protocol is adapted.

9 Claims, 3 Drawing Sheets

(56) References Cited

U.S. PATENT DOCUMENTS

| | | |
|---|---|---|
| 2009/0228122 A1 | 9/2009 | Baier et al. |
| 2009/0254671 A1* | 10/2009 | Richard .............. H04L 12/2836 709/230 |
| 2010/0070634 A1 | 3/2010 | Ranjan et al. |
| 2013/0114394 A1* | 5/2013 | Hu ...................... H04L 43/0811 370/216 |
| 2013/0173751 A1* | 7/2013 | Zachos .................. H04L 69/08 709/219 |
| 2013/0332635 A1* | 12/2013 | Bolton ................ H04M 1/7253 710/105 |

* cited by examiner

METHOD FOR REMOTE MAINTENANCE OF A DEVICE

CROSS-REFERENCE TO RELATED APPLICATION

This application claims the priority, under 35 U.S.C. §119, of German patent application DE 10 2012 006 046.7, filed Mar. 27, 2012; the prior application is herewith incorporated by reference in its entirety.

BACKGROUND OF THE INVENTION

Field of the Invention

The present invention relates to a method for the remote maintenance of devices including a computer, by way of a remote maintenance computer wherein at least one protocol is used to exchange data between the computer and the remote maintenance computer.

Nowadays many machines and devices are serviced by a remote maintenance system. The devices and machines, for example printing presses, are equipped with a computer that may establish a data connection with a remote maintenance computer, usually via a network such as the Internet. The remote maintenance computer may be located at the manufacturer of the machine or at a corresponding maintenance and service company. This is a way to enable the transfer of operating data of the machine to the remote maintenance computer via the computer of the machine and the Internet in order for the maintenance staff to initiate maintenance processes in the machine. For this purpose, the operating data of the machine are logged by the computer and transmitted to the remote maintenance computer via the Internet. In the same way, data can be transmitted from the remote maintenance computer to the computer of the machine via the Internet to carry out maintenance and service operations on the machine.

The registering and logging of operating data of a machine is described in the commonly assigned U.S. Pat. No. 7,287,473 B2. There, there is described a way of registering the operating data of a machine to enable use thereof for various purposes. One purpose may be to use them for servicing operations.

Commonly assigned U.S. Pat. No. 7,328,347 B2 describes a remote maintenance method that allows a machine to be operated from a remote maintenance computer. The method ensures that the remote maintenance computer may only initiate operations that are not hazardous to persons at the machine. In this way, safe remote maintenance is possible without endangering operating staff.

Remote maintenance usually relies on a protocol for enabling the exchange of data between the local computer, i.e., the computer of the device, and the remote maintenance computer. In the state of the art, this protocol is static. The protocol is set up for the maintenance processes that are known at the time of the delivery of the machine. As the useful life of, say, printing presses in particular is very long, a statically installed protocol frequently reaches its limits after a short period of time when new maintenance services are to be provided using the old protocol that was initially installed. Currently many problems arise in particular when a new type of communication is to be implemented between the computer of the machine and the remote maintenance computer and when attempts are made to handle this new type of communication in the existing protocol. Alternatively, the entire software in the machine computer may be updated. However, this is a considerable effort because a software update requires extensive testing to ensure that the machine computer continues to function correctly. In addition, a software update is very time-consuming because a large amount of data need to be transferred to the machine computer. Frequent software updates of the machine computer are thus impossible and consequently cycles are relatively long.

SUMMARY OF THE INVENTION

It is accordingly an object of the invention to provide a corresponding method which overcomes the above-mentioned disadvantages of the heretofore-known devices and methods of this general type and which provides for a novel method with an adaptive remote maintenance protocol.

With the foregoing and other objects in view there is provided, in accordance with the invention, a method for remote maintenance of one or a plurality of devices having a local computer, the method which comprises:

exchanging data between the local computer and a remote maintenance computer by way of at least one protocol for exchanging data;

providing a protocol adaptation level and, prior to a data transfer process, evaluating the protocol for exchanging data between the local computer and the remote maintenance computer in terms of a compatibility of the protocol with the data transfer process and, if necessary, adapting the protocol.

The method of the invention for the remote maintenance of devices basically works with the same hardware as previously known remote maintenance methods. The device, for example the printing press, usually includes a computer that is connected to a remote maintenance computer either directly or indirectly via a network and the Internet. The exchange of data between the computer of the device and the remote maintenance computer basically works in accordance with a protocol that is installed on the computer when the device is delivered. In accordance with the present invention, however, it is possible to easily update the computer of the device at any time with new service and maintenance functions and in particular with a new type of communication between the computer of the device and the remote maintenance computer. In accordance with the invention, for this purpose, a provision is made for the protocol for the exchange of data between the computer and the remote maintenance computer to be adaptable prior to a data exchange process. When a new type of communication or a new service or maintenance process that is not compatible with the existing protocol is to be applied for the remote maintenance of the device, the first step is to adapt the protocol for the exchange of data between the computer and the remote maintenance computer.

The adaptation of the protocol is preferably done by means of a protocol adaptation level on the remote maintenance computer. An advantage of this feature is that the operator of the device is not involved in the adaptation of the protocol because the adaptation of the protocol is exclusively done by the remote maintenance computer and the computer. In this way it is possible to install additional protocols at all times and in a simple way without involving the operator of the device. The protocol adaptation level is software that initiates the exchange of data. In the process, it evaluates the existing protocols in terms of their compatibility with the desired application, selects a corresponding protocol and installs it if necessary.

Furthermore a provision is made for the default protocol to be a protocol for exchanging small data units and small amounts of data. Such a protocol is also known as a lightweight protocol because it generates only a small amount of data traffic between the remote maintenance computer and the computer of the device. Due to the limitation to small amounts of data the regular communication load and the resultant data traffic are kept at a minimum. An example of such a lightweight protocol is instant messaging. Such a protocol is sufficient to find out whether the device is still in operation and functions correctly and to enable the remote maintenance computer to monitor the machine. Such a lightweight protocol allows the remote maintenance computer to be connected to a large number of devices without difficulty, enabling it to handle more than a million devices.

In accordance with a preferred embodiment of the invention, if an exchange of a large amount of data is necessary, a protocol for the exchange of large amounts of data is uploaded on the computer of the device by the remote maintenance computer. When a large amount of data is to be transmitted from the remote maintenance computer to the computer of the device via the Internet, this is impossible or requires a lot of effort when the default protocol is used. To enable the exchange of data, the invention envisages that a protocol is uploaded on the computer of the device by the remote maintenance computer to enable the exchange of large amounts of data in this way. Thus it is possible to exchange a large amount of data without difficulty at any time simply by a corresponding short-term update of the protocol.

In accordance with the invention, prior to the installation and transmission of a new protocol, the remote maintenance computer checks the protocol on the computer of the device for its compatibility for the transmission characteristic. This is a way initially to check whether the envisaged process for the exchange of data or the envisaged maintenance process, i.e. the application, is possible using the protocol currently installed on the computer of the device. If the remote maintenance computer finds that this is possible, no new protocol will be installed on the computer of the device. If, however, the remote maintenance computer finds that a new protocol is required, once the check is completed, the remote maintenance computer may select the suitable protocol and transmit it to the computer of the device via the Internet. If multiple protocols are present on the computer of the device, all of these protocols are evaluated in terms of their compatibility with the pending data transmission process. In this way, a suitable protocol may be selected on the device without requiring the transmission of a further protocol. Only if no protocol available on the computer of the device is suitable for the pending data transmission process will a new protocol be installed on the computer of the device by the remote maintenance computer. For this purpose, the remote maintenance computer selects a protocol that is suitable for the pending data transmission process and sends it to the computer of the device via the Internet. The protocol is then installed on the computer of the device. Subsequently the new protocol on the computer of the device may be used for the pending data transmission process, the application.

In accordance with a further embodiment of the invention, a provision is made for the remote maintenance computer or the computer of the device to delete one or more of the protocols stored on the computer of the device. For example, when the transmission of large amounts of data using an add-on protocol is completed, the add-on protocol will in many cases not be needed for a longer period of time because the mere monitoring of the device by the remote maintenance computer may be done using the lightweight default protocol. In this case, the remote maintenance computer or the computer of the device may delete the protocols that are not required for the standard maintenance process to make room for new protocols.

In accordance with an advantageous further embodiment of the invention, the protocol may include functions of a VPN transfer module, of a file transfer module for large files, or of a specific audio/video protocol for the transmission of audio and video data. In this way it is possible to use the VPN transfer module to ensure an encoded and safe data communication channel between the computer of the device and the remote maintenance computer to prevent third parties from accessing the transferred data. The module for the transmission of large files may in particular be an update to software elements. The audio/video module enables the maintenance staff on the remote maintenance computer to contact the operator of the device by audio or video via the Internet to control and assist in the maintenance operation. Based on the function required for the pending maintenance operation, the remote maintenance computer may transfer the suitable protocol to the computer of the device, where it may then be used for the pending maintenance process.

The present invention is particularly suited for the maintenance of printing presses. Printing presses usually have a long useful life and are frequently retrofitted with new peripheral devices. These new peripheral devices include additional functions that were not known at the time when the printing press was delivered. The present invention allows easy maintenance of such additional peripheral devices by updating the protocol of the computer of the device to enable additional maintenance functions.

Other features which are considered as characteristic for the invention are set forth in the appended claims.

Although the invention is illustrated and described herein as embodied in a method with an adaptive remote maintenance protocol, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
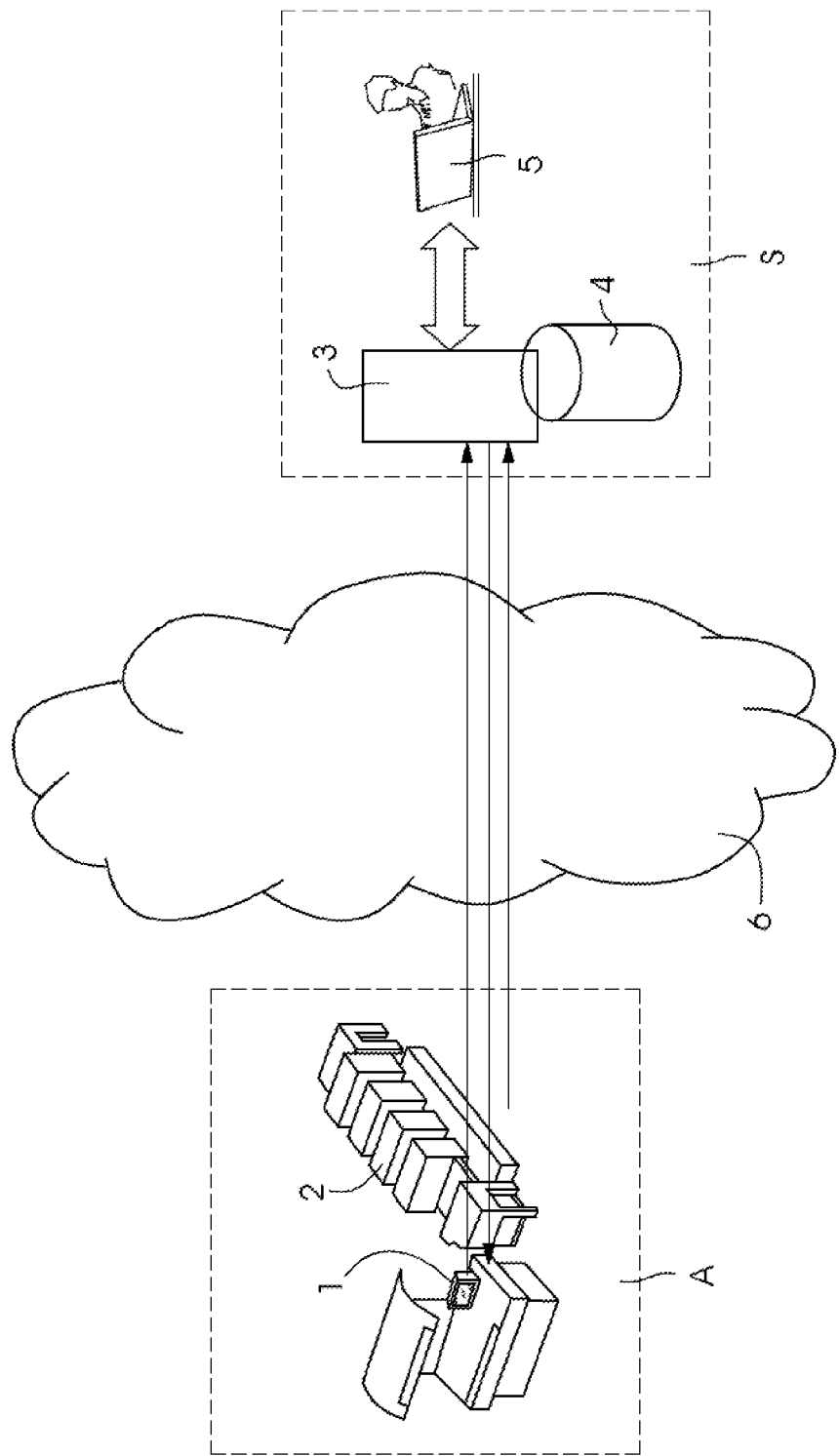
FIG. 1 is a schematic diagram illustrating a remote maintenance system for implementing the method of the invention.

Referring now to the figures of the drawing in detail and first, particularly, to FIG. 1 thereof, there is shown an exemplary embodiment of a remote maintenance system implemented, by way of example, in a printing press 2 to be serviced in a print shop A. The printing press 2 has a printing press computer 1 for controlling the printing press 2 and interfacing with the Internet 6. In addition, the printing press computer 1 carries out remote maintenance functions for example in that it registers operating data of the printing press 2 by means of sensors in the press and stores them in the computer 1. In this way, the current condition of the printing press 2 may be logged in the computer 1 and the results may be used for remote maintenance purposes. The data that have thus been stored in the computer 1 may be transmitted to a remote maintenance computer 3 via the Internet 6. In the opposite direction, data may be transmitted from the remote maintenance computer 3 to the computer 1 of the printing press 2 via the Internet 6. The remote maintenance computer 3 is located at the site of a service provider S providing services and maintenance work around the printing press 2. For this purpose, the service provider S has maintenance and service technicians who evaluate incoming operating data of the printing press 2. For this purpose, the service technicians work on a service laptop 5, which is connected to the remote maintenance computer 3. The remote maintenance computer 3 is additionally connected to a database 4. The database 4 stores programs, protocols, and software.

By default, the data communication between the remote maintenance computer 3 and the printing press computer 1 via the Internet 6 relies on what is known as a lightweight protocol a. Such a lightweight protocol a is exclusively designed for exchanging small data units. This is sufficient to monitor the printing press 2. Since only small amounts of data need to be transferred via the Internet 6, idle data traffic is minimized. This protocol a is sufficient to check whether the press 2 is in operation and to monitor the press 2. These basic functions are sufficient for the regular monitoring of the printing press 2. Since idle data traffic is minimized and only small amounts of data are transmitted between the computer 1 of the printing press 2 and the remote maintenance computer 3, the remote maintenance computer 3 may handle a large number of printing presses 2. For example, more than a million devices and machines may be administered in this way.

However, when the service technicians at the service laptop 5 intend to carry out remote maintenance processes that cannot be carried out using the default protocol a, the protocol on the computer 1 needs to be adapted. In this case the remote maintenance computer 3 accesses the computer 1 via the Internet 6 to find out which options are available by the protocols installed on the computer 1. When the required protocol is already installed on the computer 1, the remote maintenance computer 3 may select the given protocol and may start the data transmission process. When the data transmission process is completed, the protocol is closed to ensure that the idle data traffic is minimized and only a small amount of data is transmitted during regular operation.

Yet if no suitable protocol is available on the computer 1, the remote maintenance computer 3 may install the suitable protocol on the computer 1 of the printing press 2 via the Internet 6 to make it available retroactively. In the process, the suitable protocol is transferred from the database 4 to the remote maintenance computer 3, and from there to the local computer 1 of the printing press 2 via the Internet 6. When the data exchange process is completed, it is possible to leave the additional protocol on the local computer 1 of the machine 2. However, it is likewise possible to close the additional protocol once the data transfer is completed.

Figure 2:
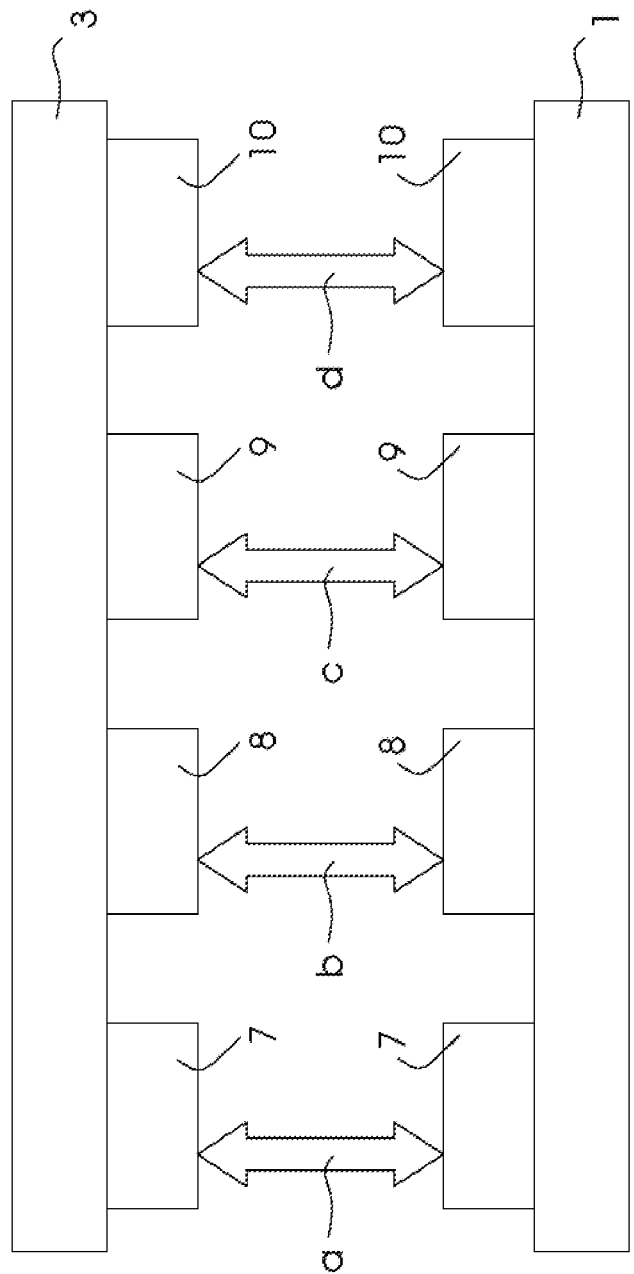
FIG. 2 illustrates the use of different protocols for remote maintenance purposes.

FIG. 2 indicates several different protocols. By default, a lightweight protocol a is installed as explained above to enable continuous data exchange between the computer 1 and the remote maintenance computer 3. This data exchange is controlled on the remote maintenance computer and on the computer 1 of the machine 2 by modules 7 for transmitting commands. The lightweight protocol a is continuously in operation and provides a continuous transfer of small amounts of data between the computer 1 and the remote maintenance computer 3. In this way it is possible to transmit, in particular, short messages and small files.

If necessary, further protocols b, c, d may be uploaded on the computer 1 of the machine by the remote maintenance computer 3 in addition to the default protocol a. For example, it is possible to use a VPN tunneling protocol b that ensures a secure data transfer between the computer 1 and the remote maintenance computer 3. For this purpose, a corresponding VPN protocol module 8 is installed on the computer 1. A specific protocol c for transferring large files may likewise be used. For this purpose, a file transfer module protocol 9 is installed on the local computer 1. Another example given in FIG. 2 is a protocol d for transferring audio/video data for which an audio/video module 10 may be provided. This audio/video module 10 is likewise transferred to and installed on the computer 1 by the remote maintenance computer 3 via the Internet 6. The audio/video module 10 may be used to organize audio and video conferences between the service technician using the service laptop 5 and the operator of the press 2.

When an optimized protocol b, c, d is to be used in addition to the default protocol a, the first step is preferably a protocol check to ensure that the additional protocol b, c, d for the desired use will actually work. In this way encumbrances such as temporary firewall settings or other IT security measures may be evaluated. If the test is not successful, communication needs to continue on the basis of the default protocol a. Otherwise, the additional protocol b, c, d is used.

The protocol check may be integrated in separate software that is likewise transferred to the device 1 from the remote maintenance computer 3. It is also possible, of course, for the protocol check to be integrated in the default protocol a. Moreover, once an additional protocol has been installed, in particular the specific protocol c for transferring large files, a provision may be made for further protocols b, d not to be transferred on the basis of the default protocol a but on the basis of the optimized protocol c. This causes the transfer of additional protocols and the installation of the additional protocols to be accelerated due to the higher speed of the protocol c, since the protocol c is particularly suited for transferring large files.

Figure 3:
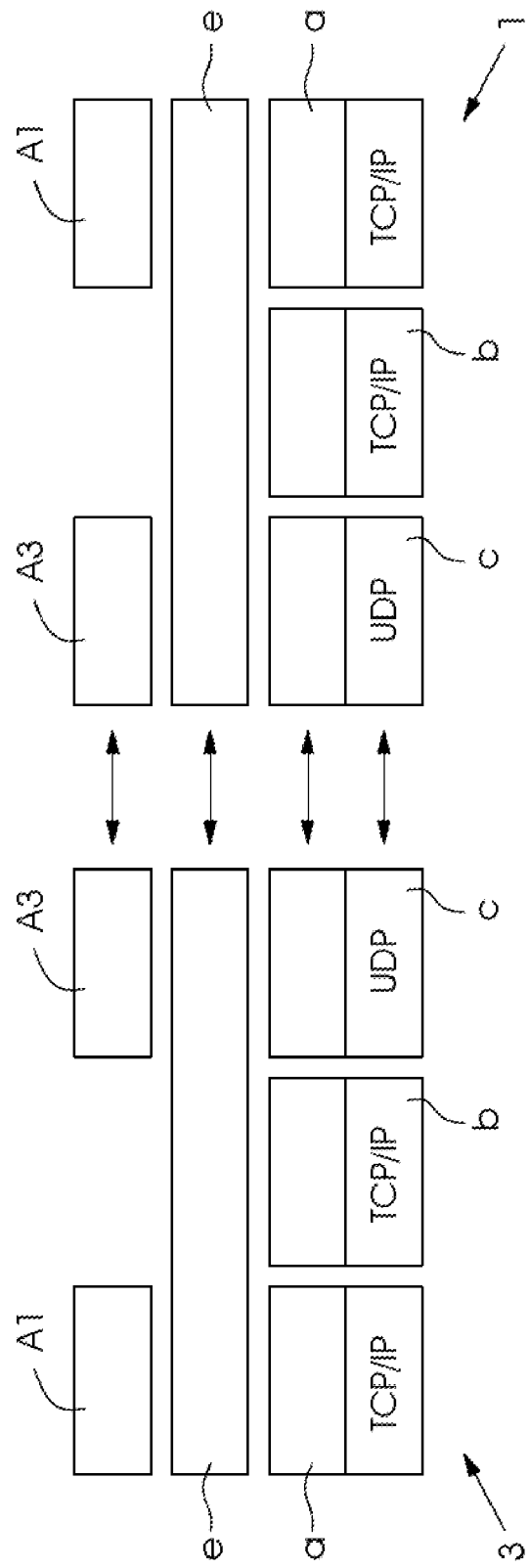
FIG. 3 is a diagram showing the software components involved in the data exchange.

FIG. 3 is a more detailed view of the communication structure shown from FIG. 2. Basically a protocol needs to be used to transfer data via the Internet 6 because without a protocol no data transfer is possible. For many data transfers on the Internet 6 TCP/IP is the default protocol. This protocol basically represents the lowest level for the exchange of data via the Internet and is used in most cases. Thus this default protocol TCP/IP is what is used to exchange data by means of the default protocol a. This default protocol is used with a first application A1 that enables continuous communication between the remote maintenance computer 3 and the machine computer 1. As a consequence, the standard protocol a that uses TCP/IP for transferring data is installed on both computer 1, 3.

In accordance with the invention, an intermediate level e is provided for adapting the protocol when protocol a is not sufficient. The protocol adaptation level e is software similar to a protocol and controls the use of the suitable protocol a, b, c, d. Thus in case of an application A3 requiring the transfer of large amounts of data, the data cannot be transferred using the default protocol a relying on TCP/IP. For this purpose, protocol adaptation level e decides how to proceed. If level e on the administrative computer 3 finds that a protocol suitable for application A3 is already installed on the machine computer 1, this protocol c for exchanging large amounts of data based on the UDP standard is used. However, if protocol c is not available on the machine computer 1, the adaptation level e will initiate the transfer and installation of protocol c on the machine computer 1. Subsequently protocol c for the exchange of large amounts of data is available and the exchange of large amounts of data to the remote maintenance computer 3 and to the machine computer 1 may be effected.

In the same way, the remote maintenance computer 3 may proceed in accordance with protocol b when the VPN tunnel protocol is used, which would be the second application. The crucial aspect is that the adaptation of the protocol on the machine computer 1 may be controlled by means of the protocol adaptation level e on the remote maintenance computer 3. Thus the download and installation of a new protocol on the machine computer 1 is always controlled by the remote maintenance computer 3 although the protocol itself does not necessarily have to be downloaded from the remote maintenance computer 3 but may also come from another computer on the Internet 6. In this way the protocol adaptation level e may activate or install a suitable protocol b, c, d on the machine computer 1 as a function of the respective application A1, A3.

If for any reason a connection via a newly installed protocol failed, the protocol adaptation level e would fall back on the default protocol a. As shown in FIG. 3, protocol a is not firmly connected to the respective application A1, but rather consists of a separate software module. In this way, applications A1, A3 do not need to be specifically assigned to the corresponding protocols a, c. Instead, the protocol adaptation level e may initially check whether an application A1, A3 may not be implemented by means of the protocols that are already available. Only if this is not the case will the protocol adaptation level e activate or install a new protocol b, c on the machine computer 1.

Considerable advantages of the present invention are that optimized protocols b, c, d for special applications may be retroactively uploaded as required and that there is no fixed association between an application and a protocol, thus providing increased flexibility. These optimized protocols offer an increased data throughput and thus better performance as well as increased availability and robustness for the respective application. Due to the module approach and structure of the protocols the protocols b, c, d for new types of applications may be retroactively made available in a printing press 2 that has already been installed.

The invention claimed is:

1. A method for remote maintenance of devices having a local computer, the method which comprises:
   exchanging data between the local computer and a remote maintenance computer by way of at least one protocol for exchanging data;
   providing a protocol adaptation level and, prior to a data transfer process, evaluating the protocol for exchanging data between the local computer and the remote maintenance computer in terms of a compatibility of the protocol with the data transfer process and adapting the protocol upon determining that the protocol is not compatible with the data transfer process, wherein for adapting the protocol, the protocol adaptation level determines whether one or more other protocols installed on the local computer are compatible with the data transfer process and if one or more compatible protocols are installed on the local computer, the protocol adaptation level selects one of the compatible protocols installed on the local computer and then starts the data transfer process, but if the protocol adaptation level determines that the other protocols installed on the local computer are not compatible with the data transfer process, the protocol adaptation level installs a new compatible protocol on the local computer and then starts the data transfer process.

2. The method according to claim 1, which comprises exchanging small data units and small amounts of data with a protocol a as a default protocol.

3. The method according to claim 2, which comprises, if an exchange of relatively large amounts of data is necessary, downloading a protocol c for exchanging the large amounts of data from the remote maintenance computer to the local computer of the device.

4. The method according to claim 1, wherein the protocol adaptation level is on the remote maintenance computer.

5. The method according to claim 4, wherein, if the protocol adaptation level on the remote maintenance computer does not find a suitable protocol on the local computer, transferring a suitable protocol from the remote maintenance computer to the local computer and using the suitable protocol for further data transfer.

6. The method according to claim 1, which comprises deleting one or more of the protocols stored on the local computer by the protocol adaptation level on the remote maintenance computer or on the local computer of the device.

7. The method according to claim 1, wherein the protocol includes functions selected from the group consisting of a VPN transfer module, a data transfer module for large files, and an audio/video module for transferring audio and video data.

8. The method according to claim 1, wherein the protocol and an application are separate modules.

9. The method according to claim 1, wherein the device is a print shop machine and the local computer is connected to the print shop machine.

* * * * *